US010871391B2

(12) United States Patent
Dechesne et al.

(10) Patent No.: US 10,871,391 B2
(45) Date of Patent: Dec. 22, 2020

(54) TOOL FOR MANAGING MULTIPLE WATER RESOURCES

(71) Applicant: VEOLIA ENVIRONNEMENT VE, Paris (FR)

(72) Inventors: Magali Dechesne, Saint Maur des Fosses (FR); Sébastien Kech, Le Pecq (FR); Boris David, Fontenay-sous-Bois (FR); Johann Mazzella, Perpignan (FR); Pierre Mandel, Paris (FR)

(73) Assignee: VEOLIA ENVIRONNEMENT VE, Paris (FR)

( * ) Notice: Subject to any disclaimer, the term of this patent is extended or adjusted under 35 U.S.C. 154(b) by 0 days.

(21) Appl. No.: 16/320,479

(22) PCT Filed: Jul. 27, 2017

(86) PCT No.: PCT/FR2017/052123
§ 371 (c)(1),
(2) Date: Jan. 24, 2019

(87) PCT Pub. No.: WO2018/020180
PCT Pub. Date: Feb. 1, 2018

(65) Prior Publication Data
US 2020/0024832 A1    Jan. 23, 2020

(30) Foreign Application Priority Data

Jul. 29, 2016 (FR) ........................... 16 57370

(51) Int. Cl.
*G01F 22/00* (2006.01)
*E03B 3/06* (2006.01)
(Continued)

(52) U.S. Cl.
CPC ............ *G01F 22/00* (2013.01); *E03B 1/00* (2013.01); *E03B 1/02* (2013.01); *E03B 3/06* (2013.01);
(Continued)

(58) Field of Classification Search
CPC .. E03B 1/02; E03B 3/06; G01F 22/00; G06Q 50/06; G05B 19/042; G05B 2219/2625
See application file for complete search history.

(56) References Cited

U.S. PATENT DOCUMENTS

2005/0246102 A1* 11/2005 Patwardhan ........... A01G 25/16
702/2
2007/0222295 A1* 9/2007 Wareham ............ H02J 13/0075
307/32
(Continued)

FOREIGN PATENT DOCUMENTS

CN    103810648 A    5/2014
KR    20150081527 A    7/2015
(Continued)

OTHER PUBLICATIONS

Foreign Communication from a Related Counterpart Application, International Search Report dated Sep. 15, 2017, International Application No. PCT/FR2017/052123 filed on Jul. 27, 2017.
(Continued)

*Primary Examiner* — Ryan A Jarrett

(57) ABSTRACT

A system for quantitative water management comprises: at least two interconnected water production entities (U), at least one water resource (S) linked to one at least of the production entities (U), at least one demander element (D) requesting water produced defined by a pre-established temporal curve of water demand produced as a function of time, each link between production entities (U), water resources (S) and demander elements (D) being ensured by a transfer work (C) having a predetermined maximum
(Continued)

flowrate and being able to be interconnected, each production entity (U) and each water resource (S) furthermore being associated with a weighting function P, and a calculator adapted to minimize the global weighting function Pg of the system while guaranteeing compliance with the pre-established temporal curve of water demand produced of each demander element (D) under constraint of compliance with the maximum flowrates of the various elements of the system.

11 Claims, 1 Drawing Sheet

(51) Int. Cl.
| | |
|---|---|
| *G05B 19/042* | (2006.01) |
| *G06F 3/05* | (2006.01) |
| *E03B 1/00* | (2006.01) |
| *G06Q 50/06* | (2012.01) |
| *E21B 43/00* | (2006.01) |
| *E03B 1/02* | (2006.01) |

(52) U.S. Cl.
CPC ............ *E21B 43/00* (2013.01); *G05B 19/042* (2013.01); *G06F 3/05* (2013.01); *G06Q 50/06* (2013.01); *G05B 2219/2625* (2013.01)

(56) References Cited

U.S. PATENT DOCUMENTS

| | | | |
|---|---|---|---|
| 2008/0065363 A1* | 3/2008 | Middya | ............... E21B 43/14 703/10 |
| 2010/0193183 A1 | 8/2010 | Lambie et al. | |
| 2014/0052421 A1* | 2/2014 | Allen | ............... G06F 30/20 703/2 |
| 2015/0339412 A1* | 11/2015 | Vitaletti | ............... G06Q 50/06 703/1 |

FOREIGN PATENT DOCUMENTS

| | | |
|---|---|---|
| WO | 2018020180 A1 | 2/2018 |
| WO | 2018020181 A1 | 2/2018 |

OTHER PUBLICATIONS

Foreign Communication from a Related Counterpart Application, International Search Report dated Sep. 14, 2017, International Application No. PCT/FR2017/052124 filed on Jul. 27, 2017.

Foreign Communication from a Related Counterpart Application, Written Opinion dated Sep. 15, 2017, International Application No. PCT/FR2017/052123 filed on Jul. 27, 2017.

Foreign Communication from a Related Counterpart Application, Written Opinion dated Sep. 14, 2017, International Application No. PCT/FR2017/052124 filed on Jul. 27, 2017.

Dechesne, Magali, et al., "Method for Determining a Maximum Allowable Volume of Water That Can Be Removed Over Time From an Underground Water Source," filed Jan. 17, 2019, U.S. Appl. No. 16/318,704.

Foreign Communication from a Related Counterpart Application, Examination Report dated Jun. 4, 2020, EP Application No. 17754760.1 filed on Jul. 27, 2017.

Eng Pham Van Tinh: "A simulationn based multi-criteria management system for optial water supply under uncertainty", dated Apr. 28, 2015, pp. 176-67, XP055622021, Oresden [retrieved Sep. 13, 2019.

Ashroof, "Groundwater Engineering Chapter Three: Groundwater Flow to Wells", Oct. 25, 2009, pp. 223-314, XP055622118, URL: http:www.hwe.org.ps/Education/Birzeit/GroundwaterEngineeringChapter%203%20%20Groundwater-%20Flow%20to%20Wells.pdf [retrieved Sep. 13, 2019].

F. Guhl, et al., "Optimisation du fonctionnement des reseaux d'ea potable. Prise en compte de l'aspect stochastique de la demande", Sep. 1, 2020, pp. 15-23 XP055621955, URL: https://hal.archives-ouvertes.fr/hal-005 O/document [retrieved Sep. 13, 2019].

Conte, Bernard, "Inteconnexion des reseaux d'eau potatble. Command optimale en temps reel des grands reseaux de distribution d'eau : application au reseau de la banlieue ouest de Paris", Cahier / Groupe Reseaux, vol. 2, No. 4, Jan. 1, 1986, pp. 68-83, XP055621953 ISSN: 1162-9630, DOi: 10.3406/flow.1986.1763.

Feldman, Mordecai "Aspects of Energy Efficiency in Water Supply Systems", Apr. 16, 2009, XP055621978 [retrieved Sep. 13, 2019].

\* cited by examiner

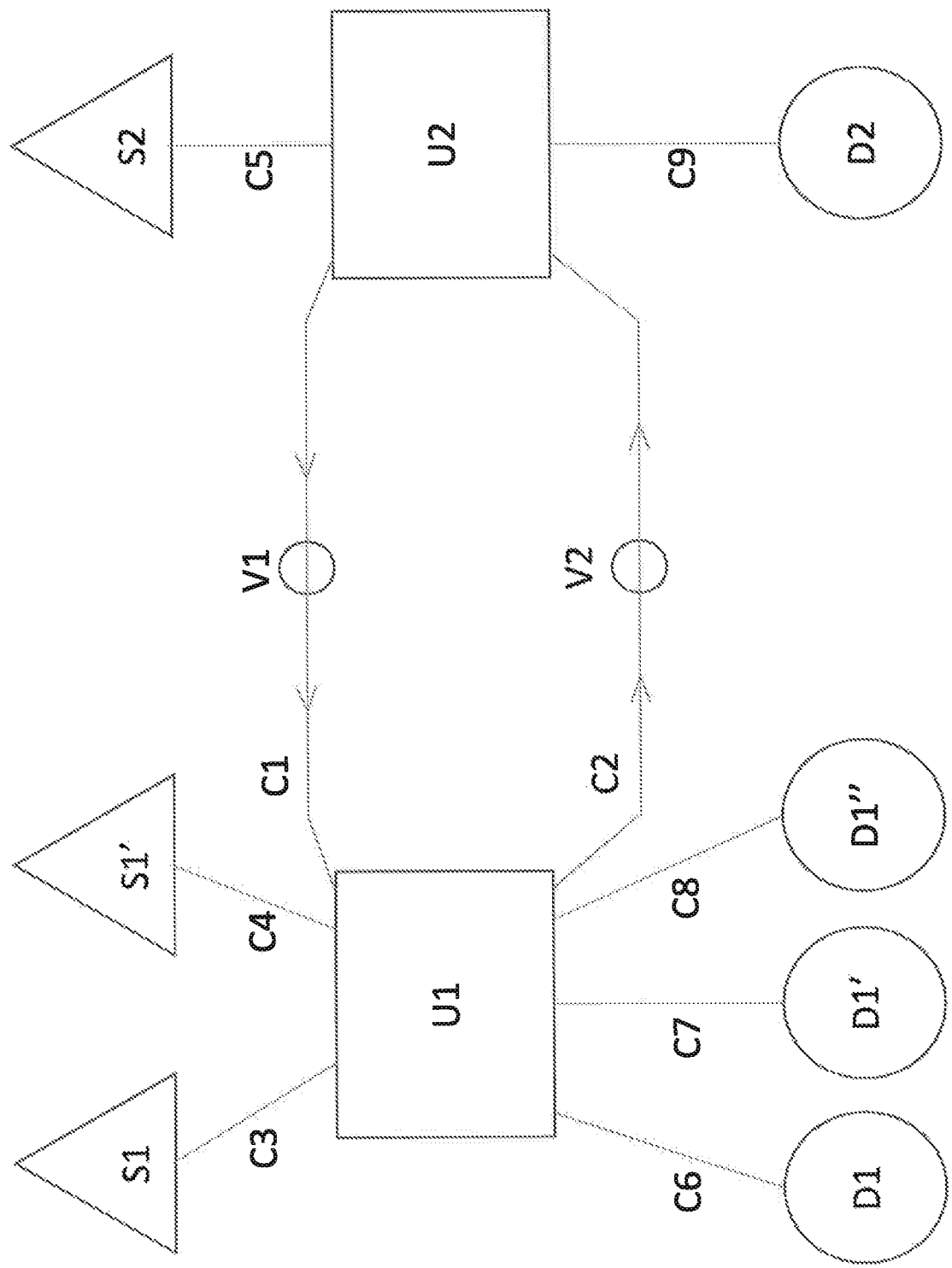

TOOL FOR MANAGING MULTIPLE WATER RESOURCES

CROSS-REFERENCE TO RELATED APPLICATIONS

The present application is a filing under 35 U.S.C. 371 as the National Stage of International Application No. PCT/FR2017/052123, filed Jul. 27, 2017, entitled "TOOL FOR MANAGING MULTIPLE WATER RESOURCES," which claims priority to French Application No. FR 1657370 filed with the Intellectual Property Office of France on Jul. 29, 2016, both of which are incorporated herein by reference in their entirety for all purposes.

The invention relates to a system and method for optimizing the allocation of several water resources to meet the demand for water produced by at least two interconnected water production units, reducing energy consumption and reinforcing water system autonomy.

TECHNICAL FIELD

Today, tensions on water exist, with varying intensity in different regions, particularly depending on local water resources. This confirms the need for tools for quantitative management of water resources.

Thus, the present invention relates to a quantitative management tool or an operational support tool, dedicated to interconnected water production systems, that is to say systems including:
  Several production units, each being fed by one or more resources,
  Water users, and
  Water resources.

The production units are interconnected for the purpose of transferring raw water or treated water to each other. This operation support tool ensures continuity of water production service during periods of water stress or otherwise, in particular by curbing energy consumption related to the operation of water systems, maintaining the best resource/demand balance, and strengthening the autonomy of the system by using the water system as much as possible.

It should be noted that in the present application, treated water is understood to mean any water that has undergone treatment before distribution, especially before being transmitted to the water users. Treated water can be drinkable or not, and dedicated to agricultural, industrial or community uses.

It should be noted that in the present application, raw water is understood to mean any water that has been harvested from a water resource, whether natural or artificial. Raw water or water resources may be of any type such as rivers, bodies of water, ground water, etc.

In the present application, water stress is understood to mean a level of water resource that is lower than the statistical average.

In the present application, autonomy in understood to be a system capable of meeting at least part of the water demand without importing water from an element, device or system external to the system according to invention.

STATE OF THE ART

Today, many software tools for quantitative management of water resources are used and can be categorized into four broad categories: Decision Support Tools (DST), generic interface and data management platforms, development environments associated with specific libraries, and self-modelling software.

However, none of the currently used systems can meet all expectations. Indeed, none of them makes it possible, for example, to simulate prospective water stress periods or new interconnections between distribution systems for allocating water to all users. Distribution system is understood to mean in the present invention all water resources, production units and users connected to at least one of the production units of the distribution system. It should also be noted that the currently used systems determine the transfer priorities and allocation of water according to the energy consumption criteria related to the production of water (single-objective optimization), and not according to the criteria of energy consumption for water production and balance between water resources and demand (multi-objective optimization). Moreover, currently, ground water (or aquifers) can be sources to be considered by the systems currently used only if a complex simulation model is implemented (2D or 3D modelling of aquifers).

There is therefore a need to provide a quantitative management system of water resources that overcomes these shortcomings, disadvantages and obstacles of the prior art. In particular, there is a need to provide a system for simulating water production strategies, these strategies are optimized according to the balance between water resources and demand, optimizing energy consumption and streamlining transfer of raw water and/or treated water between interconnected elements of the system, the aim being to reduce energy consumption related to transfers of volumes of water production units to users so as to provide water consuming the least energy possible.

Strategy in the context of the present invention, is understood to be a set of statuses each defining elements of the system and in particular each of the production units and the system water resources.

DESCRIPTION OF THE INVENTION

To solve one or more of the aforementioned drawbacks, the invention relates to a quantitative water management system comprising the following elements:
  at least two water production units that are interconnected, directly or indirectly, each production unit being defined by a maximum rate of production,
  at least one water resource feeding at least one production unit, each water resource being defined by a maximum rate of harvesting,
  at least one user of the water produced defined by a pre-set time curve for demand for produced water as a function of time,
each link between production units, water resources and users being provided by a transfer structure with a maximum transfer rate and/or pre-set minimum, the transfer structures can be interconnected, and each production unit and each water resource being further associated with a weighting function P.

According to the invention, water resources can be of any type such as rivers, bodies of water, ground water, etc.

It should be noted that water production units are called interconnected, directly or indirectly, because they can be directly connected to each other or can be connected to each other indirectly by being connected to a common element.

With this objective in view, the system according to the invention, likewise according to the preamble cited above, is characterized in that it comprises a first computer for minimizing the overall weighting function Pg of the system, the sum of all weighting functions of the various elements of the system, while ensuring compliance with the pre-set time curve of produced water demand of each user, while complying with the maximum flow rates and/or minimum flows of the different elements of the system.

Weighting function P of an element of the system in the present invention, is understood to be a mathematical weighting function defined as a multiplying factor of the water stream flowing through the element. This multiplying factor is defined as a value that can be arbitrarily set, or set on the basis of the energy consumption associated with that element. The value of the multiplying factor depends on constant values and variable values.

Constant values in the present invention, are understood to mean user-defined arbitrary values, prioritizing the allocation of water in the elements of the system. Constant values represent constraints that constrain the system and limit the transfer of water between the various elements of the system. These constant values are characteristic of each or a set of system elements.

Constraints in the present invention are understood to be the minimum and/or maximum of transfer between system elements, the water production capacities of the production units and the water resources, storage capacities of the production units and of the water resources, or furthermore the downstream outlet flows of water resources. Note that these constraints may be technical or regulatory.

Varying values in the present invention are understood to be values which are based on water flow allocations in the system.

Transfer structure in the present invention is understood to be any structure adapted to transfer water between two relatively distant points.

According to the invention, a weighting function P is associated with each system production unit and each system water resource. For a given strategy, each water resource and each system production unit is a weighting function.

For the purposes of the present invention, the term overall weighting function Pg is the sum of the different weighting functions P of the various production units and the system water resources.

According to the invention, the overall weighting function Pg should be minimized, taking into account the availability of water resources.

Thus, to minimize the weighting functions P of each water resource and each system production unit, and thus to minimize the overall weighting function Pg, it is necessary to minimize the variable values which define each of the weighting functions.

The objective of the first computer is to generate a production strategy on the basis of the objective of minimizing weighting functions P of each water resource and each production unit for 100% meeting of the demand. The first computer performs a single-objective optimization constraining water allocation and distribution of water flow in the system to meet the demand for produced water. The single-objective optimization algorithm generates results defining the production strategy.

Single-objective optimization algorithm in the present invention is understood to be a series of operating rules applied in a specific order, with a finite number of data on the system elements in order to determine, in a finite number of steps, the optimal strategy to meet the objective of meeting demand for produced water, while taking into account hydrological resources mobilized by the system and within the constraints of the system.

Advantageously, the meeting of the pre-set produced water demand time curve of each produced water user is further constrained to respect water volumes harvested from water resources, volumes of water produced by production units and system constraints.

Advantageously, the different transfer structures comprise valves controlled by the first computer so that the system gives to users, in real time, the produced water according to the pre-set time curve minimizing the overall weighting function Pg while respecting the constraints of the system.

Advantageously, the production unit associated with the lowest weighting function P transmits produced water giving priority to the unit for producing water associated with the highest P weighting function and/or transmits the produced water giving priority to the user associated with the highest weighting function P.

Advantageously, a production unit connected to several water resources prioritizes harvesting a volume of water from the source associated with the lowest weighting function P.

Advantageously, the system according to the invention further comprises a second computer adapted to define production strategies to meet the demand while minimizing energy consumption, each strategy corresponding to a percentage of the pre-set time curve of the user and said second computer being connected to the first computer so that said first computer generates a minimum value of the overall weighting function Pg for each production strategy, said second computer being further adapted to determine the best strategy, defined as the strategy providing the maximum percentage of meeting demand for a ratio of the variation of the overall weighting function Pg and the variation of the minimized demand. The second computer performs a multi-objective optimization constraining water allocation and distribution of water flow in the system to meet the demand for produced water and to minimize energy consumption. The multi-objective optimization algorithm generates results defining production strategies.

Multi-objective optimization algorithm in the this invention in understood to be a series of operating rules applied in a specific order, with a finite number of data on the system elements to determine, in a finite number stages, all the best strategies to meet the objective of meeting the demand and the objective of minimizing the energy consumption of the system, taking into account hydrological resources mobilized by the system within the constraints of the system.

The second computer is intended to generate different scenarios defining different percentages of meeting demand. This second computer, together with the first computer, also aims to associate an overall weighting function Pg with each percentage of meeting demand. This of overall weighting function Pg corresponds to the lower overall weighting function Pg satisfactory to the selected scenario. This lower overall weighting function Pg is defined by the sum of the weighting functions P of the production units and water resources, and the overall weighting function Pg then represents the best strategy that meets a particular scenario.

Advantageously, the system according to the invention further comprises a third computer adapted to define the hydrology of resources and the pre-set produced water demand time curve of the users, based on historical data analysed by statistical algorithms.

This third computer aims to generate multiple scenarios characterizing the statuses of the system resources and/or characterizing the status of the water demand of the users. These scenarios can be generated and can be statistically based on raw historical data entered by the operator.

The third computer, the use of which is optional, comprises a set of statistical algorithms that generate the input data used by the first two computers. These input data are relating either to hydrological scenarios regarding the water resources, or the pre-set produced water demand time curve.

Scenario in the present application is understood to be the pre-set and projected progress of a situation based on the hydrology of the water resources and/or water demand of simulated users. Scenarios are used to input data to single- or multi-objective optimization algorithms of the first and second computer.

This third computer therefore makes it possible, for example, for the operator to directly import data on the hydrology of the resources and/or a pre-set water demand time curve, with or without statistical modelling.

Note that the first two computers or three aforementioned computers may be part of a single computer ensemble which may be carriable and have every feature of the first two or three aforementioned computers.

In a particular embodiment of the invention, at least one water resource is an aquifer, the volume of harvestable water of which is determined on the basis of the water table.

The invention also relates to a quantitative method for managing water in a system comprising the following elements:
- at least two water production units that are interconnected, directly or indirectly, each production unit being defined by a maximum rate of production,
- at least one water resource connected to at least one of the production units, each water resource being defined by a maximum rate of harvesting,
- at least one produced water user defined by a pre-set produced water demand time curve as a function of time, with each connection between production units, water resources and users being provided by a transfer structure having a pre-set maximum transfer flowrate, these transfer structures can be interconnected, each production unit and each water resource also being associated with a weighting function P.

With this objective in view, the method according to the invention, furthermore according to the preamble cited above, is essentially characterized in that it comprises the following steps:
- determination of all global weighting functions Pg, and
- selection of the lowest overall weighting function Pg.

It should be noted that all determined global weighting functions Pg meet the flow requirements of the production units and water resources.

In a particular embodiment of the invention, the method of the invention further comprises a step of determining, on the basis of the water table, an available and/or harvestable volume from a system water resource.

Said step of determining, on the basis of the water table, a volume that is available and/or harvestable from a system water resource can be applied to any system independent of the system of the invention. It can be used outside the context of the invention to improve the operating practices of groundwater catchments, through the definition of a critical level of operation and the determination of harvestable groundwater volumes.

Preferably, the step of determining, on the basis of the water table, a volume that is available and/or harvestable from a water resource comprises the following steps:
- determining the historical time series of the aquifer at the harvesting point by measuring the pseudo-static water table of the water resources at a pre-set time;
- determining a relationship between the pseudo-static water table and the transmissivity at the harvesting point;
- determination of the critical operating level at the harvesting point;
- selection of a regional reference water table;
- determining an empirical relationship between the monthly average regional reference water table and the monthly average pseudo-static level at the harvesting point.

Advantageously, the step of determining, on the basis of the water table, a volume of water that is available and/or harvestable from a water resource further comprises the steps of:
- transformation of the average measured monthly regional reference water table into an average monthly pseudo-static level at the harvesting point by applying the empirical relationship;
- calculating the maximum allowable drawdown at every moment by linear interpolation;
- calculation of the maximum volume of harvestable water.

BRIEF DESCRIPTION OF THE FIGURE

The invention will be better understood on reading the following description, given solely by way of example and with reference to the attached FIGURE which shows an example of a system according to the invention.

DESCRIPTION

Introduction

The objectives of the invention are, firstly, to minimize the overall weighting function Pg of a quantitative water management system in order to obtain a system as independent as possible, with the lowest possible energy consumption, while meeting constraints. Particularly, the present invention describes in particular a quantitative water management system comprising the following elements:

a) at least two interconnected water production units U, each production unit U being defined by a maximum rate of production, b) at least one water resource S connected to the at least one of production units U, each water resource S being defined by a maximum harvest flow rate, c) at least one user D of produced water by defined a pre-set produced water demand time curve as a function of time.

Interconnected Water Production Units

For the purposes of the present invention, the term water production unit U is understood to be any unit for producing water, potable or otherwise, and any unit adapted to transfer water to any element to which it is connected, said water not necessarily being treated water.

Thus, produced water, treated water, and transferred water in the present invention are understood to be all the volumes of water from one of the production system units U according to the invention.

It should be noted that in the invention, the water production units U serve to produce water without there being any processing and/or treating a volume of water introduced into the production unit U, or to transfer a volume of water to another unit in the system to which it is connected.

Water Resources

System water resources S can be underground raw water resources (springs, aquifers, karsts, etc.) equipped with catchments. Water resources S can also be equipped with surface water catchments (lakes, rivers, etc.).

According to one variant embodiment of the invention, at least one water resources of the system S to which is connected at least one production unit U is an aquifer, the volume of harvestable water is determined, on the basis of the water table.

It should be noted that water resource S may be connected to one or more production units U of the system according to the invention.

The Water Produced Elements Seekers

The users D of produced water can be communities, industrial entities, agricultural entities, or any other user D wishing to be supplied with treated or non-treated water.

A user D is generally connected to a single production unit U. However, according to the invention, a user D can be connected to different production units U. In this configuration, according to the invention, a user D is supplied with water from the production unit U associated with the lowest weighting function P. It should be noted that a water tower type element may also be between one or more production units P and one or more users D.

It should be noted that a user D may be connected to one or several production units U of the system according to the invention.

The Pre-Set Water Demand Time Curve

The water demand by the users D is instantaneous and may be followed on a time curve. However, it is also possible to make a water demand curve by simulation in order to anticipate demand or to observe differences on the basis of the simulated demands in order to plan, over a predetermined period, the volume of water to be harvested and produced according to the demand for water. Therefore, said pre-set water demand curve can be obtained by simulation using the third computer (see below), following the use of historical data related to the system and relating to past situations, or using data to anticipate future demand.

The Connections between each Unit

In order for the various system elements to exchange water therebetween, it is necessary for each connection between production units U, water resources S and users D to be ensured via a transfer structure C having a pre-set maximum transfer flow rate thus limiting the exchange rates between different system components.

It should be noted that according to the invention, system transfer structures C connecting each of the elements may include valves V to control the water exchange between the different elements of the system according to the invention.

For example, according to the invention, transfer structures C that can be used are aqueducts, galleries, canals, pipes, overhead or underground water transfer devices.

Weighting Function

According to the invention, each production unit U and each system water resource S is associated with a weighting function P. This weighting function P takes into account many variables and constant technical criteria and is defined as the sum of the values of variables and constant values.

For example, the constant values may be arbitrary values that are set by the operator that prioritize the allocation of water in the system components.

The variable values, in turn, can for example be on the basis of:

priorities set by the operator regarding users D that govern the flow allocation in the system; thus the highest priority users D will be served first;

and can also be on the basis of:

transfer structures C of the system, each system transfer structure C being characterized by a coefficient.

The greater this coefficient, the greater the energy consumed by the transfer structure C in question in order to achieve a water transfer.

These coefficients are incorporated into the weighting function P of each water resource S and each production unit U to satisfy the pre-set produced water demand time curve. In this way, for example, the weighting function P of a system water resource S connected to a production unit U of the system by a transfer structure C consuming a great amount of energy is higher than a function relating to a transfer structure C consuming a small amount of energy.

According to the invention, the higher the weighting function P of a component of the system, the more the water it delivers requires high energy consumption and/or more restrictive the hydrologic/hydraulic/regulatory constraints applying to the element of the system in question. Note that the goal is to deliver the water that consumes the least possible while ensuring as much as possible the energy autonomy of the system of the invention, and while respecting existing constraints on water resources S and production units U to at least one user D, likewise on the basis of its constraints. Thus, preferably, a production unit U connected to several water resources S prioritizes harvesting a volume of water from the resource associated with the lowest weighting function P so as to minimize the weighting function.

For a particular strategy, that is to say for a status characterizing the resources of the system S and/or characterizing water demand of users D, each water production unit U and each system water resources S is associated with several weighting functions respecting the water allocation to users and water transfers satisfying water demand. Thus, a particular strategy is determined for a given period by the hydrology of water resources S (river flow rates, water tables of aquifers) and water demand of users D.

It should be noted that several strategies can be the result of a particular scenario. Indeed, the system, for a particular scenario, is defined by a set of weighting functions P assigned to each production unit U and system water resource S. However, for a given scenario, different strategies are possible, so different sets of weighting functions P are possible.

An overall weighting function Pg thus defines each strategy and corresponds to the sum of all weighting functions P of each of the elements of the system for a particular scenario.

It should be noted that the best strategy for a particular scenario corresponds to the lowest overall weighting function Pg.

The First Computer

The system of the invention includes a first computer adapted, in a first step, for determining and calculating the set of weighting functions P of each of the elements of the system for a particular strategy that meets 100% of the water demand of the users D. In a second step, the first computer is adapted to calculate and determine the overall weighting function Pg, the sum of the weighting functions of each of the system elements, the lowest that can meet 100% of the water demand of the users D.

It should be noted that according to a preferred embodiment of the invention, the valves V of the different transfer structures C are controlled by the first computer so that the system gives, to users D in real time, the produced water according to the pre-set time curve minimizing the overall weighting function Pg.

It is also noted that, according to the invention, several production units U are connected together. Thus, in a preferred embodiment of the invention, the production unit U associated with the lowest weighting function P transmits water produced in priority to the water production unit U associated with the highest weighting function P. In this way, if a user D is only connected to a single production unit U, the weighting function P of this production unit U can be adjusted after exchanges of water with one or a plurality of other system production units U connected thereto in order to make possible the least possible energy consuming water transmission to the user D. These water exchanges are controlled by the first computer which may or may not actuate the valves V of the transfer structures C thereby allowing the exchange of water between the different interconnected system production units U.

Also, in the event that several water production units are connected with one another, it is possible according to the invention that the production unit U that are defined by the greatest weighting function P transmits the water to that defined by the lowest weighting function. By succession, the production units U that are defined by high weighting functions, can transmit water to those defined by lower weighting functions. In this way, the weighting functions of the system elements tend to align to, as much as possible, transmit water to the users D consuming the least amount of energy.

In this configuration, the weighting functions P and the balance between the water resources S and water demand are taken into account to achieve a single objective optimization: meet 100% of demand.

Second Computer

Preferably, a second computer can also be used and adapted to define different strategies for meeting demand. The second computer is adapted to generate, depending on the scenarios, production strategies to meet different percentages of demand. These different percentages of satisfaction can be, for example, 70%, 80%, 85%, 92% of the water demand. For each percentage of satisfaction, said second computer, in cooperation with the first computer, is adapted to associate a global weighting function Pg in a production strategy. The second computer is further adapted to highlight the lowest overall system weighting function Pg for a particular percentage of meeting demand.

Thus, it is possible to simulate, according to different levels of satisfaction of demand, the water exchange between the different elements of the system and also the volume of water to be harvested from the water resources.

It should also be noted that the second computer is further adapted to determine the optimal strategies that form the Pareto front for a production unit U in particular. These optimal strategies are defined as strategies providing a maximum percentage to a minimized ratio defined as the variation of energy consumption, on which the weighting function P of the particular production unit depends, with respect to the variation in demand. Thus, one can make, by simulation, a percentage curve of meeting demand (in %) depending on the energy consumption of a particular production unit U of the system according to the invention. Using this curve, one can observe that the overall weighting function Pg of the production unit U increases on the basis of meeting the demand, to a rate of satisfaction, for example close to 99%. A slope break can then be observed (the slope decreases) which means that after the slope break, energy consumption will increase faster than demand satisfaction. A second slope decrease can for example be located at about 99.6% of meeting demand.

Therefore, the most interesting result, i.e. the one for which energy consumption is the lowest in view of the curve for such demands, corresponds to the first change in slope. Indeed, when the demand satisfaction rate is 99% for a weighting function X, said weighting function X increases faster over satisfaction of demand higher than 99%. Thus, using this curve generated by the second computer, it is notable that, to meet 100% of demand, it would be better to import water from another production unit U external to the system.

In other words, from a 99% rate of demand satisfaction, the power consumption of the production unit U in question increases. Consequently, according to the invention, the first computer may open a valve V which connects this production unit U to another for said unit, when it reaches, in our example, 99% of satisfaction, can receive water from another unit in order not to increase its energy consumption and thus does not increase the overall system weighting function Pg.

Thus, using the second computer, it is possible to determine when it is appropriate, for example, to exchange water between the system components. In this configuration, the weighting functions P and the balance between water resources S and water users D are taken into account to achieve a multi-objective optimization: as much as possible to meet the demand for a low as possible overall weighting function Pg, while minimizing energy consumption related to the production of said water. It is thus possible to provide produced water production strategies determined by two conflicting goals, satisfaction of demand defined by the pre-set time curve and the associated energy consumption.

Third Computer

In a preferred embodiment of the invention, a third computer can also be used to define the first computer input data and the second computer: hydrology scenarios of the resources S (water course flow rates, water tables of aquifers) as well as the scenarios of produced water demand time curves in relation to water demand units D. Thus, this third computer simulates hydrology scenarios of the resources S and water demand in relation to users D based on historical data entered by an operator.

However, the input data may not be simulated by the third computer, and can be created by an operator from raw data.

This third computer is adapted, e.g., to generate a series of prospective data on different time horizons (1 month, 3 months, 6 months), based on the frequency statistical analysis of historical time series data of each resource S and user D, quantifying the probabilistic return time of observed events.

Regarding status of the water resource S (flows, water table), the third computer may for example offer three typical scenarios: a wet year (return period of 2.5 years, 5 years, and 10 years) median year, and dry year (return period of 2.5 years, 5 years, and 10 years).

And concerning the water demand, the third computer may propose the following scenarios: minimum demand, median demand, peak demand, quantile set by the operator.

Links between the Three Computers

It is noteworthy that the three aforementioned computers can be only one computer (or two) adapted to meet the different expectations, and provide the same functionality of the three computers.

The use of three computers makes it possible, for example, to simulate the hydrology of one or more water resources S over a predetermined duration, and to simulate water volume values desired by one or several users D to best anticipate the amounts of water that would be required to be harvested from the water resources S and the volume of water to be produced by the production units U of the system to meet water demand. This anticipation can minimize the overall weighting function Pg of the system to the extent that if water demand is too high, in view of the volume of water that can be produced and/or harvested, it is possible to anticipate water exchanges between the different interconnected production units U of the system.

Alternatively, the three computers can be used for planning over a predetermined period the amount of water to be harvested from at least one water resource S and the volumes of water to be produced on the basis of the pre-set time demand curve for at least one user D.

This set of three computers is further adapted to replay past situations to enhance and/or improve the system by minimizing the weighting functions P of the elements of the system, to better understand future situations.

This set of three computers also can simulate the effects of changes in the system of the invention: removal or addition of a production unit U, removal or addition of a water resource S, removal or addition of a transfer structure C connecting a production unit U to any element of the system, adding, modifying, or removing a constraint. Thus, one can simulate adjustments of the system and control the variations of the weighting functions P of the system elements, including overall weighting functions Pg based on the applied scenarios.

This set of three computers can be used in "Operational management" for weekly and monthly harvest and production planning, or "Research and development" mode to replay past situations to better manage future situations or to assess the impact of new development.

Harvestable Volume Module

According to a preferred embodiment of the invention, at least one water resource S of the system, to which is connected at least one production unit U, is an aquifer, the volume of harvestable water of which is determined, on the basis of the water table. In this configuration of the invention, the method for determining the groundwater level makes it possible to indirectly take into account the hydrogeological conditions of the aquifer, and the natural and human phenomena affecting the quantitative status of the aquifer. This method is simple, robust and applicable to continuous aquifers (non-karst, not fractured) for multiple configurations of abstractions (boreholes, collector wells, wellfields) with the exception of spring water catchments.

It should be noted that the configuration may exist wherein the harvestable water volumes are determined by the flow of the water resource S and not the water table value.

It should be noted that this method can be applied to any system regardless of the system described in the present invention.

This method makes it possible to evaluate the volumes of water harvestable from an aquifer, and thus determine essential data for assessing the weighting function P of such a water resource S. This data is then transmitted to the first computer for it to calculate the variable values which define such a water resource S, and the weighting function P of such a source S in order to calculate the overall weighting function Pg of the system in real-time, and minimize said function.

It should be noted that the quantitative management of groundwater and the definition of harvestable volumes within an aquifer or aquifer system requires first to define the spatial boundaries of everything in question. These limits are defined by local geological and hydrogeological characteristics.

The definition of harvestable volume of groundwater within an aquifer or aquifer system also requires having a good knowledge of the status of the water resources S, a precise hydraulic report on all water inputs and outlets in the system (natural or man-made), and to evaluate its intrinsic storage capacity. These limits are defined based on general characteristics of the catchment being used.

Quantitative groundwater management therefore requires a knowledge of the status of the water resources S, water harvesting and water needs.

Thus, according to the invention, the operational data transmitted to the first computer therefore comprise data relating to:
- the general characteristics of the catchment in question: for example, the geological section which is a schematic representation of the succession of geological formations on a vertical profile, indicating the associated ratings, or the technical section which is a schematic representation of the features and dimensions of the equipment in an underground structure on a vertical profile [examples: bare hole, the features of the pre-casing and casing, filtering gravel, cementation, head protection]),
- geologic and hydrogeological data, e.g. regional water table, the transmissivity or the storage coefficient, and
- operating data: e.g. level measurements and the reference water table, the harvested volumes, flow rates of one or more of the pumps.

Other operating data such as the number of daily hours of pumping and the average daily flow at a given moment are optional.

Furthermore, this methodology is based on the use of the analytical solution of Jacob Cooper (Cooper, H. H. and C. E. Jacob, 1946. *A generalized graphical method for evaluating formation constants and summarizing well field history*, Am. Geophys. Union Trans., vol. 27, pp. 526-534) commonly used in quantitative hydrogeology. It provides an estimate of the maximum volume of groundwater harvestable according to the drawdown, itself dependent on the static water table of the aquifer.

This method comprises the following calibration steps:
- determination of the historical time series of the aquifer at the harvesting point by measuring the pseudo-static water table of the water resource S for a pre-determined time period;
- determination of a relationship between the pseudo-static water table and the transmissivity at the harvesting point;
- determination of the critical use level at the harvesting point;
- selection of a regional water table reference;
- determining an empirical relationship between the average monthly regional water table reference and the average monthly pseudo-static water table at the harvesting point.

For example, time series can be analysed for a minimum of two years.

The relationship between the pseudo-static water table and the transmissivity at the harvesting point can be determined, using the operational data of the aquifer, via the Cooper-Jacob analytical relationship.

It should be noted that the critical operating level of a well or a borehole can be conditioned by:

the upper altimetric water table of the screened portion of the casing;

the local use limit of the water table of the aquifer, which can be:

a water table for maintaining the status of the aquifer, a water table for non-intrusion into the saltwater wedge, a water table for non-dewatering of a productive area, a regulatory water table (target water table, alert threshold . . . )

the water table of the suction strainer of the pump or the safety water table that triggers the pump to turn off.

The highest water table, therefore the worst, will be retained as a critical operating level for the structure, noted as $z_{NC}$. Determining the critical level therefore requires having the technical section and the geological section of the structure, and the possible existence of regulatory water tables for aquifer management.

In the case of a wellfield, the least favourable critical level will be selected and applied to the conceptual catchment.

It should be noted that the selection of a regional reference water table requires listing all water tables collecting the groundwater body being studied. These water tables can be identified easily by consulting the ADES database (www.ades.eaufrance.fr), in France for example, and by searching for water level monitoring stations for a mass of water. Among these water tables, only those who are active and who have a sufficient history (ideally above 10 years) will be considered.

The regional reference water table will be retained in the following manner: minimizing the RMSE between the monthly average of the pseudo-static water table at the catchment and the translation of the monthly average of the static water table measured via piezometer over the duration of common observation.

This translation (denoted $h_{Spt}$) is obtained by adding to each value of the static monthly series ($h_{Sp}$) of the piezometer the relative difference between the average of the pseudo-static monthly water table at the catchment ($\underline{h_{Sc}}$) and the average static odds monthly piezometer ($\underline{h_{Sp}}$).

$$h_{Spt}(t)=h_{Sp}(t)+(\underline{h_{Sc}}-\underline{h_{Sp}})$$

In the event of several piezometers with a similar RMSE, the one with the longest history will be retained.

An empirical relationship, usually linear, or consisting of a plurality of linear segments, will be retained and will express the piezometric monthly average theoretical pseudo-static water table at the catchment as a function of the average monthly water table at the reference piezometer. This empirical relationship can be achieved by using one or more linear regressions on a scatter-plot graph, or a graph with other correlation functions.

The methodology may further include the following simulation steps:

transformation of the average monthly regional reference water table at a given time into an average monthly pseudo-static water table at the harvesting point by applying the empirical relationship;

calculating the maximum allowable drawdown for each moment by linear interpolation;

calculation of the maximum volume of harvestable water, each time, depending on the maximum allowable drawdown and the relationship between the pseudo-static piezometric head and transmissivity to the collection, using the relationship of Cooper-Jacob.

It should be noted that this method makes it possible to calculate a theoretical maximum harvestable volume on the basis of a pseudo-static water table and critical use level for a catchment. This theoretical maximum harvestable volume is not necessarily attainable in operating conditions.

The sub-step of transforming the static water table of the piezometer into a pseudo-static water table at the water resource S, will only be performed in the case of a predictive simulation. A predictive monthly water table series of static levels will be generated for the reference piezometer using the third computer.

The empirical linear relationship or all of said relationships obtained in the previous step, to calculate the theoretical average monthly pseudo-static water table at the catchment as a function of the average monthly water table at the reference piezometer will used.

The length of the history available on the regional monitoring piezometers, and the reliability of the measured data, makes using the third computer at this point more reliable than the catchment directly, hence the use of a transposition method.

The maximum allowable drawdown, $s_{max}$, variable over time t, is defined as the difference between the pseudo-static water table $h_{ps}$ and the critical use level, denoted $z_{nc}$.

$$s_{max}(t)=h_{ps}(t)-z_{nc}$$

The maximum harvestable volume $V_{max}$ is calculated at each moment of the simulation, using the relationship of Cooper-Jacob (1946) and the relation $T=f(h_{ps})$ obtained in the previous step. It depends on the maximum allowable drawdown $s_{max}$:

$$V_{max}=Q_{max}\cdot t_{exp}=\frac{4\pi T(h_{ps})s_{max}}{2{,}303}\frac{t_{exp}}{\log\left(\frac{2.25T(h_{ps})t_{exp}}{r^2 S}\right)}$$

$t_{exp}$ being the maximum use duration.

In determining the maximum harvestable volume, the $t_{exp}$ value is set by default to 20 hours/day. In the case of a well field, the maximum harvestable volume will be the volume harvestable by all catchments in it.

Thus, this methodology takes into account the indirect hydrological situation, the effects of groundwater recharge/depletion and natural phenomena that influence the pseudo-static water tables measured at the catchment. It also takes into account the indirect effects of all harvesting on the aquifer and human activities that influence pseudo-static water tables measured at the catchment.

Thus, according to this preferred method of the invention, it is possible to forecast future availability of water resources S based on:

water trends updated from day to day, the integration of climate change as a variable in the medium- and long-term scenarios, The quantitative monitoring of groundwater is verified, according to the preferred embodiment of the invention, by verifying the variations in the water table of the aquifers. However this quantitative monitoring can also be verified by measuring the speed of discharge points (springs) according to the type of aquifer. Quantitative groundwater management usually amounts to setting goal water tables, which is to set harvestable volumes.

The invention has been illustrated and described in detail in the drawings and the foregoing description. This must be considered as illustrative and given as an example and not as limiting the invention to this description alone. Many variants are possible.

An Example of a System According to the Invention

According to the invention, there may be a quantitative water management system comprising the following components (see FIGURE):

two production units U1 and U2: a first water production unit U1 and a second water production unit U2 are interconnected by two transfer structures C1 and C2 each comprising a valve V1 and V2;

the first production unit U1 is connected to two water resources S1 and S1' by two transfer structures C3 and C4 and the second production unit U2 is connected to a single water resource S2 by a C5 transfer structure;

three users D1, D1' and D1" are connected to the first production unit U1 by transfer structures C6, C7 and C8, and a single user D2 is connected to the second production unit U2 by a transfer structure C9, each user being characterized by a pre-set time curve of demand for produced water.

The users are characterized by a pre-set time curve of demand for produced water which must be satisfied 100%. However, it may not be possible to meet demand 100%. However, using computers, it is possible to maximize the satisfaction of the demand while minimizing the overall weighting function Pg' of the system.

In this configuration, each system unit is associated with a weighting function P. In other words, the first production unit U1 is associated with weighting function PU1, the second production unit U2 is associated with weighting function PU2, the water resources S1, S1' and S2 are respectively associated with the weighting functions PS1, PS1' and PS2. The goal is to minimize the overall weighting function Pg' which is the sum of all the weighting functions of the system components.

To this end, an optimization algorithm determines the set of global weighting functions Pg', making it possible to meet the pre-set time curve water demand, according to the different weighting functions P of the system elements. Finally, the algorithm selects the lowest overall weighting function Pg'.

According to the invention, the first computer, which can collect data of the algorithm, controls valves V1 and V2 so that the production units U1 and U2 exchange water therebetween to reduce the maximum overall weighting function Pg of the system in order for said overall weighting function Pg' to correspond to that selected by the algorithm.

For example, it can be assumed that the weighting function PU2 is higher than that of PU1. This may be due, for example, to the fact that the operation of the resource S2 is more energy intensive than that of S1 and/or that of S1', in other words that the weighting function PS2 is higher than PS1 or PS1'. In this situation, it is preferable for the second production unit U2 to transmit water from the first production unit U1 to the user D2. Indeed, the first production unit U1 produces water at a lower weighting compared to the water produced by the second unit U2. Thus, it is wise to stop the production of water of the second production unit U2, or at least to reduce the water harvested from the resource S2.

Using this exchange between production units U1 and U2, the overall weighting function Pg of the system can be minimized to the extent that the weighting function of water resource S2 is no longer completely to be considered.

Thus, the second production unit U2 transmits water at a lower weighting to the user D2 and the first production unit U1, however, transmits water to users D1, D1', and D1" which come from resources S1 and S1'. It should be noted that if the weighting function PS1 is higher than that of PS1', the production unit U1 will prioritize harvesting water from the resource S1'.

The aforementioned directions prevail for a configuration at a given moment in time when one has control of the valves, but also in simulation configuration.

In the claims, the word "comprising" does not exclude other elements and the indefinite article "a" does not exclude a plurality.

The invention claimed is:

1. A quantitative water management system comprising the following elements:
    at least two water production units (U) that are interconnected, directly or indirectly, each production unit (U) being defined by a maximum rate of production,
    at least one water resource (S) feeding the at least one production unit (U), each water resource (S) being defined by a maximum harvest flow rate,
    at least one user (D) of produced water defined by a pre-set time curve of demand for produced water as a function of time,
    each connection between the production units (U), the water resources (S) and the users (D) being provided with a transfer structure (C) having a pre-set maximum flow rate, wherein said transfer structures (C) may be interconnected,
    each production unit (U) and each water resource (S) being further associated with a weighting function P,
    said system being characterized in that it comprises a first computer adapted to minimize the overall weighting function Pg of the system, which is the sum of all weighting functions P of the various elements of the system, while ensuring compliance with the pre-set time curve of demand for produced water of each user (D) and with the constraint of respecting the maximum flow rates and/or minimum flows of the different elements of the system,
    in that it further comprises a second computer adapted to define production strategies to meet the demand while minimizing enemy consumption, each strategy corresponding to a percentage of the pre-set time curve of the user (D), and said second computer being connected to the first computer so that said first computer generates a minimum value of the overall weighting function Pg for each production strategy, said second computer being further adapted to determine an optimal strategy defined as the strategy providing the maximum percentage of meeting demand for a variation ratio of the overall weighting function Pg for a variation of the minimized demand.

2. The system according to claim 1, characterized in that the satisfaction of the pre-set time curve of demand for produced water of each user (D) of produced water is further constrained to respect the volume of harvestable water from the water resources (S), the volume of water produced by the production units (U) and system constraints.

3. The system according to claim 1, characterized in that the different transfer structures (C) comprise valves (V) controlled by the first computer so that the system gives to users (D) in real time, produced water according to the pre-set time curve minimizing the overall weighting function Pg, while respecting the constraints of the system.

4. The system according to claim 1, characterized in that the production unit (U) associated with the lowest weighting function P transmits produced water prioritizing the water production unit (U) associated with the highest weighting function P and/or transmits produced water prioritizing the user (D) associated with the highest weighting function P.

5. The system according to claim 1, characterized in that a production unit (U) connected to multiple water resources (S) prioritizes harvesting a volume of water from the source associated with the lowest weighting function P.

6. The system according to claim 1, characterized in that it further comprises a third computer adapted to define the hydrology of the resources (S) and the pre-set time curve of demand for produced water for the users (D), according to historical data analysed by statistical algorithms.

7. The system according to claim 1, characterized in that at least one water resource (S) is an aquifer, the volume of harvestable water of which is determined on the basis of the water table.

8. A method of quantitative water management of a system comprising the following elements:
- at least two water production units (U) that are interconnected, directly or indirectly, each production unit (U) being defined by a maximum rate of production,
- at least one water resource (S) connected to the at least one of the production units (U), each water resource (S) being defined by a maximum harvest flow rate,
- at least one user (D) of produced water defined by a pre-set time curve of demand for produced water as a function of time,
- each connection between the production units (U), the water resources (S) and the users (D) being assured by a transfer structure (C) having a predetermined maximum transfer flow, said transfer structures (C) being interconnected,
- each production unit (U) and each water resource (S) being further associated with a weighting function P, said method being characterized in that it comprises the following steps:
  - determination of all global weighting functions Pg, and selection, by a first computer, of the lowest overall weighting function Pg said method being characterized in that it further comprises the following steps:
- definition, by a second computer, of production strategies to meet the demand while minimizing energy consumption, each strategy corresponding to a percentage of the pre-set time curve of the user (D),
- determination, by the second computer, of an optimal strategy defined as the strategy providing the maximum percentage of meeting demand for a variation ratio of the overall weighting function Pg for a variation of the minimized demand,
- generation, by the first computer, of a minimum value of the overall weighting function Pg for each production strategy,
- said second computer being connected to the first computer.

9. The method according to claim 8, characterized in that it further comprises a step of determining, on the basis of the water table, a volume that is available and/or harvestable from a system water resource (S).

10. The method according to claim 9, characterized in that the step of determining, on the basis of the water table, a volume of water that is available and/or harvestable from a water resource (S) comprises the steps of:
- determination of historical time series of the aquifer at the harvesting point by measuring the pseudo-static water table of the water resource (S) for a predefined duration;
- determination of a relationship between the pseudo-static water table and the transmissivity at the harvesting point;
- determination of the critical operating level at the harvesting point;
- selection of a regional reference water table;
- determining an empirical relationship between the monthly average regional reference water table and the monthly average pseudo-static water table at the harvesting point.

11. The method according to claim 10, characterized in that the step of determining, on the basis of the water table, a volume of water that is available and/or harvestable from a water resource (S) further comprises the steps of:
- transforming the measured average monthly regional reference water table into a monthly average pseudo-static water table at the harvesting point by applying the empirical relationship;
- calculating the maximum allowable drawdown at each moment by linear interpolation;
- calculation of the maximum volume of harvestable water.

* * * * *